(12) United States Patent
Rudy

(10) Patent No.: US 10,090,730 B2
(45) Date of Patent: Oct. 2, 2018

(54) LINEAR ACTUATOR

(71) Applicant: Schaeffler Technologies AG & Co. KG, Herzogenaurach (DE)

(72) Inventor: Dietmar Rudy, Kleinbundenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 55 days.

(21) Appl. No.: 15/021,443

(22) PCT Filed: Aug. 5, 2014

(86) PCT No.: PCT/DE2014/200381
§ 371 (c)(1),
(2) Date: Mar. 11, 2016

(87) PCT Pub. No.: WO2015/035989
PCT Pub. Date: Mar. 19, 2015

(65) Prior Publication Data
US 2016/0226337 A1    Aug. 4, 2016

(30) Foreign Application Priority Data

Sep. 11, 2013 (DE) .................. 10 2013 014 935
Nov. 7, 2013 (DE) .................. 10 2013 222 649

(51) Int. Cl.
*B23B 31/26* (2006.01)
*H02K 7/06* (2006.01)
(Continued)

(52) U.S. Cl.
CPC ............ *H02K 7/06* (2013.01); *B23B 31/261* (2013.01); *B23B 31/28* (2013.01); *H02K 1/22* (2013.01);
(Continued)

(58) Field of Classification Search
CPC ... B23B 31/261; B23B 31/28; B23B 2231/50; B23B 2260/11; H02K 7/06; H02K 1/22;
(Continued)

(56) References Cited

U.S. PATENT DOCUMENTS 5,140,739 A    8/1992   Yamaguchi et al.
6,318,516 B1   11/2001  Zernickel et al.
(Continued)

FOREIGN PATENT DOCUMENTS

CN    101895171    11/2010
CN    101944791    1/2011
(Continued)

OTHER PUBLICATIONS

Office Action for European Application No. 14766103.7 dated Oct. 30, 2017.

*Primary Examiner* — Daniel Howell
*Assistant Examiner* — Paul M Janeski
(74) *Attorney, Agent, or Firm* — Volpe and Koenig, P.C.

(57) ABSTRACT

A linear actuator including an electric motor having a stator and a rotor, in addition to a screw drive having a spindle and a nut which is guided by the rolling element on the spindle and which is coupled to the rotor. The nut is mounted in a rotationally fixed manner on a housing component by a planetary roller bearing.

10 Claims, 2 Drawing Sheets

(51) Int. Cl.
*B23B 31/28* (2006.01)
*H02K 1/22* (2006.01)
*H02K 5/173* (2006.01)
*H02K 7/00* (2006.01)
*H02K 7/08* (2006.01)
*H02K 7/116* (2006.01)

(52) U.S. Cl.
CPC ............. *H02K 5/173* (2013.01); *H02K 7/003* (2013.01); *H02K 7/085* (2013.01); *H02K 7/116* (2013.01); *B23B 2231/50* (2013.01); *B23B 2260/11* (2013.01)

(58) Field of Classification Search
CPC ........ H02K 5/173; H02K 7/003; H02K 7/085; H02K 7/116
See application file for complete search history.

(56) References Cited

U.S. PATENT DOCUMENTS

| | | |
|---|---|---|
| 8,102,089 B2 | 1/2012 | Lemmers, Jr. et al. |
| 2011/0273063 A1 | 11/2011 | Vuolle-Apiala et al. |
| 2015/0015104 A1 | 1/2015 | Kataoka et al. |

FOREIGN PATENT DOCUMENTS

| | | |
|---|---|---|
| CN | 102237751 | 11/2011 |
| DE | 19747074 A1 | 4/1999 |
| DE | 10351484 | 6/2005 |
| DE | 102007014714 | 10/2007 |
| DE | 202009015840 | 4/2010 |
| JP | 07276114 A * | 10/1995 |
| WO | 2013118319 | 8/2013 |

* cited by examiner

LINEAR ACTUATOR

FIELD OF THE INVENTION

The invention relates to a linear actuator comprising an electric motor with a stator and a rotor, as well as a screw drive with a spindle and a nut guided on the spindle by rolling elements, wherein this nut is coupled with the rotor.

BACKGROUND

Linear actuators are used for performing linear adjustment actions. One example that, however, does not limit the scope of this invention, is the use in a machine tool as a disengaging unit that enables a tool to be exchanged in a tool holder in which the tool can be fixed.

Linear actuators are known in different structural forms as referenced, for example, in DE 20 2009 015 840 U1. A linear actuator is described there that is likewise used for actuating a tool holder. The linear actuator comprises an electric motor with a stator and rotor, wherein a threaded spindle is coupled with the rotor, consequently it is rotated by the rotor. The threaded spindle is part of a screw drive that is constructed there as a planetary rolling contact gear. This screw drive further comprises a nut that can be moved axially by the screw drive, wherein the nut is fixed in a rotation-proof manner by a corresponding anti-rotation device. An axially moveable piston rod that leads to the tool holder is coupled with the nut.

On one side, the spindle is supported by the screw drive, here, the planetary rolling contact gear, on the other side, that is, on the other side of the rotor, there are several angled-contact ball bearings that are used for radial and axial support. The structure of this linear actuator, however, is very complex and, in particular, intensive in terms of installation space.

SUMMARY

The invention is based on the objective of providing a linear actuator that is improved relative to the previous arrangement.

To meet this objective, a linear actuator is provided according to the invention, comprising an electric motor with a stator and a rotor, as well as a screw drive with a spindle and a nut that is guided on the spindle by rolling elements and is coupled with the rotor, wherein the nut is supported so that it can rotate on a housing component by a planetary rolling contact bearing.

In the linear actuator according to the invention, for one, the nut that is part of the screw drive is coupled with the rotor, that is, such that the nut rotates during operation of the electric motor. It is naturally fixed in position, viewed in the axial direction, that is, such that the spindle is moved axially by the screw drive. This spindle realizes the actual adjustment action. For supporting the nut, a planetary rolling contact bearing is now provided according to the invention by which the nut is supported so that it can rotate on a housing component. This planetary rolling contact bearing is thus used, on one hand, for radial support, but on the other hand, also for axial support, according to which planetary rolling contact bearings can be loaded considerably, viewed in the axial direction, so that the desired axial support is given. At the same time, a planetary rolling contact bearing requires little installation space, so that overall a compact support of the nut can be achieved.

The planetary rolling contact bearing itself is arranged axially adjacent to the stator, consequently it is positioned as close as possible to the stator, which is beneficial to compactness.

For supporting the nut by the planetary rolling contact bearing, the nut is preferably provided itself on its outer side with corresponding grooves on which the planets of the planetary rolling contact bearing run. The nut is thus part of the planetary rolling contact bearing and provided with the corresponding ball races. Alternatively, there is naturally the option of arranging a corresponding inner ring with the grooves on the nut.

The planets also roll in a corresponding outer ring of the planetary rolling contact bearing that is preferably held in a housing-side, complementary-shaped recess.

As described, the rotor is connected to the nut that is supported on the housing side by the planetary rolling contact bearing. The rotor itself is also supported so that it can rotate by a radial bearing, in particular, a rolling contact bearing, on another optional housing part in the interior of the stator. Consequently, the second bearing or support plane is realized by this radial bearing. At this position, a simple radial bearing is sufficient, according to which, the planetary rolling contact bearing provides sufficient axial support of the entire assembly consisting of nut and stator.

In one preferred refinement of the invention, the rotor is constructed as a hollow component and has a section forming the nut. That means that the rotor and the nut form an integral structural unit, which is beneficial for compactness, because there are no additional fasteners.

According to one especially advantageous refinement of the invention, this hollow component is here constructed such that the section that forms the nut extends partially into the stator, so that the screw drive is held at least in some sections in the interior of the stator. Because the component, as designed, is hollow, its interior can be used for holding necessary components, here the screw drive. That means that the screw drive is located partially in the stator interior; preferably it is located entirely in the interior of the stator. This allows an even more compact design, because the section that forms the nut has to project only a short distance out from the stator, namely, far enough that the planetary rolling contact bearing can be positioned accordingly. This produces an extremely compact structural unit, especially with a screw drive held completely in the interior of the stator.

The screw drive itself is preferably a planetary rolling contact gear. This includes, in a known way, the corresponding threaded groove on the spindle in which run the corresponding sections of the planets of the planetary rolling contact gear that are naturally fixed in corresponding retaining rings. Also provided are corresponding outer rings that are fixed on the nut, that is, rotate with the nut, and have corresponding grooves on the inner sides in which, in turn, corresponding sections of the planets provided with grooves roll. When the rotor rotates and thus also the nut rotates, the planets rotate, which in turn leads to a corresponding axial displacement of the spindle due to the threaded groove on the spindle.

As described, the very compact form according to the invention can realize corresponding linear adjustment actions by the linear actuator. Thus it can be used in any technical areas, for example, in the area of automotive engineering and the like.

It is preferably used, in particular, as part of a tool holder of a machine tool. The invention therefore also relates to a tool holder for a machine tool comprising a tool spindle that can be driven with a clamping device that can be moved axially and is provided in the interior of the spindle for clamping the tool against a retaining section provided on the spindle side, wherein the clamping device can be connected detachably to the tool by a connection section and can be moved axially into a clamped position by one or more spring elements and can be moved into an unclamped position against the restoring force of the spring element or elements. For realizing this axial movement into the unclamped position, a linear actuator of the described type according to the invention is provided whose spindle can be coupled detachably to the clamping device.

The linear actuator is used in the tool holder according to the invention for actuating the clamping device such that it can be moved from a clamped position in which it is moved automatically by the one or more spring elements, typically plate spring assemblies, and in which the tool is clamped on the spindle side, into the unclamped position. In the clamped position, the tool can be moved by the spindle and can perform its function. For detaching the tool, the spindle of the screw drive is now moved a small distance axially by the linear actuator for corresponding control and rotation of the rotor. In the scope of this movement, a coupling is realized with the clamping device that is then moved against the restoring force of the plate spring assembly or assemblies. In this way it is pressed into the unclamped position in which the tool can be removed from the retaining section. After insertion of a new tool, the linear actuator is actuated in the opposite direction, thus the nut rotates in the other direction, so that the threaded spindle is tightened again. The clamping device is unloaded, the plate spring assembly or assemblies press the clamping device back into the clamped position, and the tool is fixed in place again.

BRIEF DESCRIPTION OF THE DRAWINGS

An embodiment of the invention is shown in the drawings and is described in more detail below. Shown are.

DETAILED DESCRIPTION OF THE PREFERRED EMBODIMENTS

Figure 1:
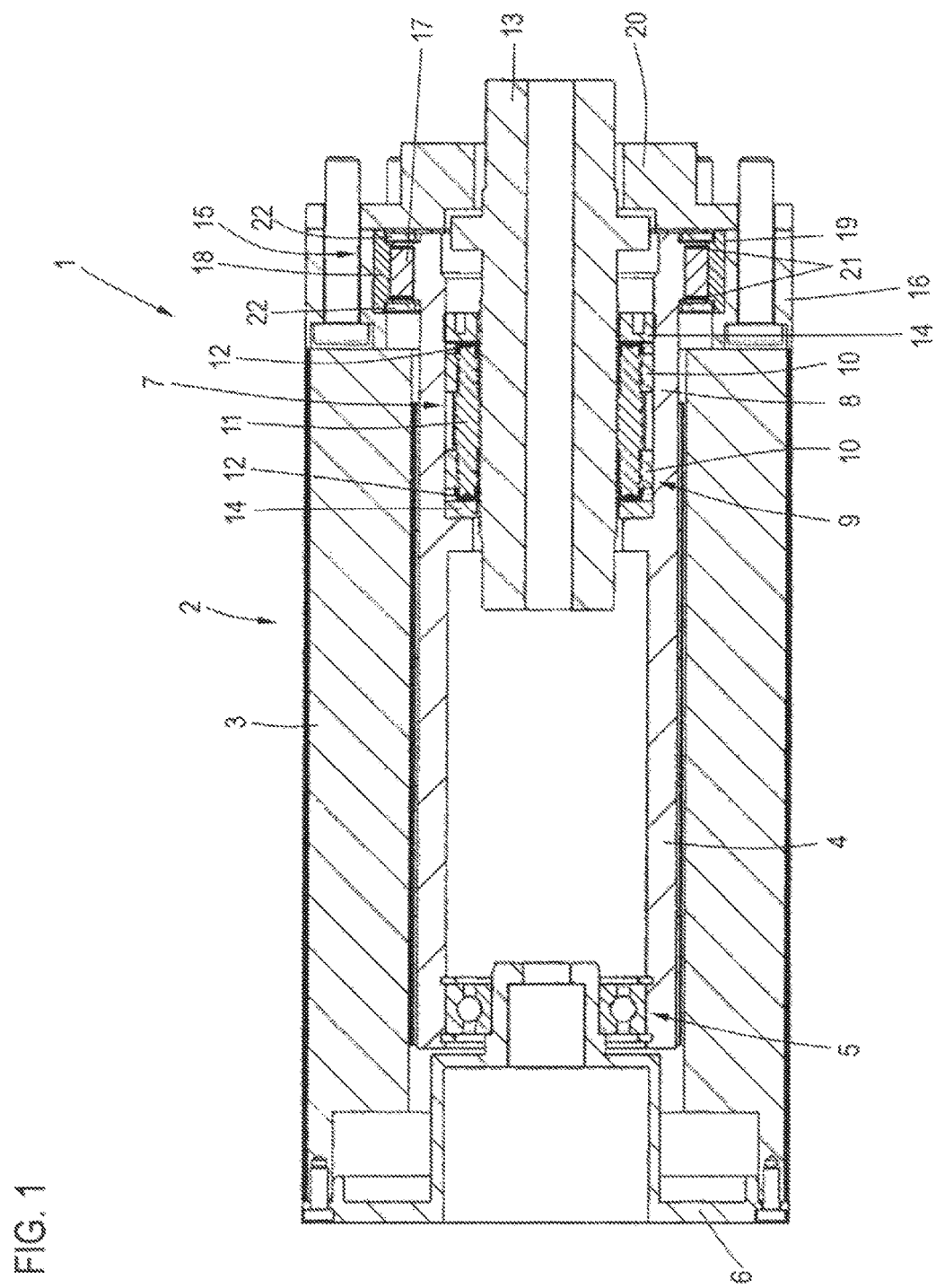
FIG. 1 a basic diagram of a linear actuator according to the invention.

FIG. 1 shows a linear actuator 1 according to the invention, comprising an electric motor 2 with a stator 3 and a rotor 4. Not shown in more detail is a corresponding power supply and control device that are naturally to be provided for operation. The rotor 4 is constructed as a hollow component. It is supported so that it can rotate by a radial bearing 5, here a ball bearing, on a housing component 6 that is fixed on the stator side.

The rotor 4 has a hollow section 7 that forms a nut 8 that is part of a screw drive that is here constructed as a planetary rolling contact gear 9. The section 7 is constructed such that it is located for the most part in the interior of the stator 3, so that, see FIG. 1, the screw drive is also located almost entirely in the interior of the stator.

The planetary rolling contact gear 9 comprises, in the illustrated example, two outer rings 10 that are held rotationally locked in the nut 8 and have, on their inner sides, in a known way, corresponding grooves. Also provided are multiple planets 11 that are held in corresponding spacer washers 12 with their end sides. The planets 11 have two end sections that are likewise provided with grooves and mesh with the grooves of the outer rings 10. A middle, somewhat larger in diameter section also has, in a known way, grooves that mesh on their side with the groove of a spindle 13, wherein the groove of the spindle 13 has a pitch, consequently, is constructed as a thread. A rotation of the nut 8 thus leads to a rotation of the planets 11, which necessarily leads to an axial movement of the spindle 13 due to the thread shape of the spindle-side groove. In the interior of the nut 8 there are two bearing washers 14 on which the support washers 12 are supported.

The section 7, that is, the nut 8, extends a distance out from the stator 3. Adjacent to the stator 3, the nut 8 is supported on a housing component 16 of the linear actuator 1 by a planetary rolling contact bearing 15. The nut 7 quasi represents the inner ring of the planetary rolling contact bearing 15. It has a corresponding groove shape on its outer side, wherein the planets 17 of the planetary rolling contact bearing 15, which naturally also have corresponding grooves, roll in these grooves. An outer ring 18 of the planetary rolling contact bearing 15, which also has grooves in which the planets 17 roll, is held in a shape-compatible recess 19 of the housing component 16 and fixed accordingly by another housing component 20. Through the use of the planetary rolling contact bearing 15, the nut 8 and thus the rotor 4 itself, which is formed integrally with the nut 8, is supported radially on this side, and also supported axially, because the planetary rolling contact bearing 15 is simultaneously used as an axial bearing. It is in the position to receive considerable axial forces, according to which a plurality of corresponding planets 17 are arranged distributed around the circumference. Here, the planets are naturally also held in corresponding spacer washers 21 that are in turn supported by corresponding retaining washers 22.

It can be seen that the linear actuator according to the invention has an extremely compact design. This is because, on one hand, due to the construction of the rotor 4 as a hollow component with shaped nut 8, there is the ability to arrange the screw drive, here the planetary rolling contact gear 9, entirely in the stator. In addition, the radial and axial support of the rotor 4 and the nut 8 is realized by only two bearings, namely, on one hand, by the radial bearing 5 and, on the other hand, by the planetary rolling contact bearing 15. Because the radial bearing 5 is also arranged in the interior of the stator and the planetary rolling contact bearing 15 directly adjacent to the stator, overall a very compact design is produced.

Figure 2:
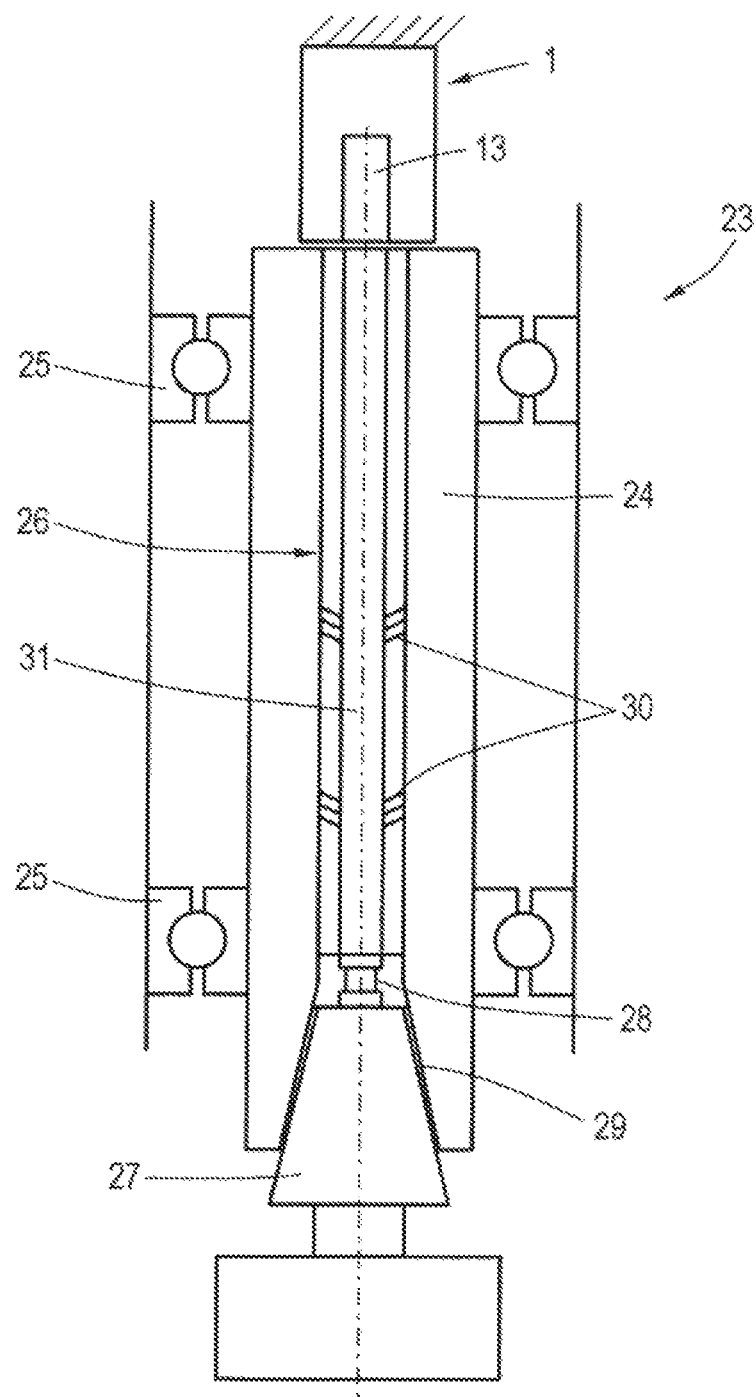
FIG. 2 a basic diagram of a tool holder according to the invention.

FIG. 2 shows, in the form of a basic diagram, an embodiment of the linear actuator 1 according to the invention as part of a tool holder 23 according to the invention. This comprises a tool spindle 24 that can be rotated by a drive that is not shown in more detail; it is supported so that it can rotate by corresponding bearings 25.

In the interior of the spindle 24 there is a clamping device 26 that is used for the detachable holding and clamping of a tool 27. This clamping device 26 comprises a corresponding connection section 28, that is, a suitable clamping element on which the tool 27 can be detachably mounted. Through the use of the clamping device 26 it is possible to clamp and fix the tool 27 against a corresponding retaining section 29 of the spindle 24. In the case of a spindle rotation, the tool 27 consequently also rotates.

For this purpose, the clamping device 26 has multiple spring elements 30, here, in the form of suitable plate spring assemblies. These move the clamping device 26 that has a corresponding rod 31 connected to the spring elements 30 on which the connection section 28 is provided into a clamped position in which the connection section 28 is pulled in addition to the tool 27 against the retaining section 29 of the spindle 24.

To now actuate the clamping device 26 for detaching and thus for changing the tool 27, the linear actuator 1 according to the invention is provided. Of this actuator, the spindle 13 is shown as an example. In the clamped position shown in FIG. 2, this is not coupled with the clamping device 26, here the rod 31. Therefore, the spindle 24 rotates in the clamped position.

If now, however, the clamping device 26 is to be unclamped, the linear actuator 1 is actuated, so that the rotor rotates. Due to the corresponding rotation of the nut, the spindle 13 moves axially and is extended. It pressed from above against the rod 31 that is pressed somewhat out from the spindle 24 against the restoring force of the spring elements 30. This has the result that the tool 27 previously clamped against the retaining section 29 is moved out from its contact on the retaining section 29. It is unclamped and can be replaced. After a new tool in inserted, for clamping this tool the linear actuator 1 is again actuated, so that the rotor 4 and with it the nut 8 rotates in the opposite direction. This has the result that the spindle 13 is tightened again, the rod 31 is unloaded, and the spring elements 30 move the rod 31 and with it the connection section 28 in addition to the tool 27 back into the clamped position, in which the tool 27 is clamped tightly against the retaining section 29.

LIST OF REFERENCE NUMBERS

1 Linear actuator
2 Electric motor
3 Stator
4 Rotor
5 Radial bearing
6 Housing component
7 Section
8 Nut
9 Planetary rolling contact gear
10 Outer rings
11 Planets
12 Spacer washers
13 Spindle
14 Bearing washers
15 Planetary rolling contact bearing
16 Housing component
17 Planets
18 Outer ring
19 Recess
20 Housing part
21 Spacer washers
22 Retaining washers
23 Tool holder
24 Tool spindle
25 Bearing
26 Clamping device
27 Tool
28 Connection section
29 Retaining section
30 Spring element
31 Rod

The invention claimed is:

1. A linear actuator comprising an electric motor with a stator and a rotor, a planetary gear drive with a spindle, a first plurality of planets, and a nut, wherein the first plurality of planets mesh with the spindle and the nut, and wherein the nut is coupled with the rotor, and is supported axially and radially for rotation on a housing component by a planetary rolling contact bearing having a second plurality of planets arranged to mesh with an outer ring and the nut via grooves in the outer ring and the nut, and wherein the planetary gear drive includes one or more outer rings rotationally locked in the nut, wherein the one or more outer rings mesh with the first plurality of planets.

2. The linear actuator according to claim 1, wherein the planetary rolling contact bearing is arranged axially adjacent to the stator.

3. The linear actuator according to claim 1, wherein the nut includes grooves in which the planets of the planetary rolling contact bearing run on an outer side of the nut.

4. The linear actuator according to claim 1, wherein the planetary rolling contact bearing includes the outer ring that is held in a housing-side, complementary-shaped recess.

5. The linear actuator according to claim 1, wherein the rotor is supported so that for rotation on another housing component in an interior of the stator by a radial bearing.

6. The linear actuator according to claim 1, wherein the rotor is constructed as a hollow component and has a section forming the nut.

7. The linear actuator according to claim 6, wherein the section forming the nut extends partially into the stator, so that the screw drive is held at least in some sections in an interior of the stator.

8. The linear actuator according to claim 7, wherein the planetary gear drive is held completely in the interior of the stator.

9. A tool holder for a machine tool, comprising a tool spindle that is driven with an axially moveable clamping device provided in an interior of the tool spindle for clamping the tool against a retaining section provided on a spindle side, the clamping device is connected detachably to the tool by a connection section and is movable by one or more spring elements axially into a clamped position and is movable against a restoring force of the one or more spring elements into an unclamped position, and for an axial movement into the unclamped position, a linear actuator according to claim 1 is provided and the spindle is detachably coupled with the clamping device.

10. A linear actuator comprising an electric motor with a stator and a rotor, a planetary gear drive with a spindle, a first plurality of planets, and a nut, wherein the first plurality of planets mesh with the spindle and the nut, and wherein the nut is coupled with the rotor, and is supported axially and radially for rotation on a housing component by a planetary rolling contact bearing having a second plurality of planets arranged to mesh with an outer ring and the nut via grooves in the outer ring and the nut, and wherein the planetary rolling contact bearing is arranged axially beyond the stator.

* * * * *